(12) United States Patent
Federmann et al.

(10) Patent No.: US 10,170,775 B2
(45) Date of Patent: Jan. 1, 2019

(54) METHOD FOR PRODUCING A SOLDER GLASS GREEN SEAL

(71) Applicant: FORSCHUNGSZENTRUM JUELICH GMBH, Juelich (DE)

(72) Inventors: Dirk Federmann, Kevelaer (DE); Hans-Rainer Zerfass, Taunusstein (DE); Sonja-Michaela Gross-Barsnick, Aachen (DE)

(73) Assignee: Forschungszentrum Juelich GmbH (DE)

( * ) Notice: Subject to any disclaimer, the term of this patent is extended or adjusted under 35 U.S.C. 154(b) by 370 days.

(21) Appl. No.: 14/784,198

(22) PCT Filed: Apr. 10, 2014

(86) PCT No.: PCT/DE2014/000189
§ 371 (c)(1),
(2) Date: Oct. 13, 2015

(87) PCT Pub. No.: WO2014/177125
PCT Pub. Date: Nov. 6, 2014

(65) Prior Publication Data
US 2016/0072137 A1    Mar. 10, 2016

(30) Foreign Application Priority Data
May 3, 2013   (DE) .......................... 10 2013 007 703

(51) Int. Cl.
*C03C 8/24*   (2006.01)
*H01M 8/0282*   (2016.01)
*C03C 14/00*   (2006.01)
*C04B 35/622*   (2006.01)
*H01M 8/124*   (2016.01)

(52) U.S. Cl.
CPC ............ *H01M 8/0282* (2013.01); *C03C 8/24* (2013.01); *C03C 14/002* (2013.01); *C04B 35/62218* (2013.01); *H01M 2008/1293* (2013.01)

(58) Field of Classification Search
CPC .... C03C 4/16; C03C 8/04; C03C 8/08; C03C 8/10; C03C 8/16; C03C 17/04; H01J 11/12; H01J 11/38
See application file for complete search history.

(56) References Cited

U.S. PATENT DOCUMENTS

| 3,907,585 A | 9/1975 | Francel et al. |
| 4,725,480 A | 2/1988 | Gurol |

(Continued)

FOREIGN PATENT DOCUMENTS

| DE | 24 52 832 | 6/1975 |
| DE | 83 02 243 | 1/1983 |

(Continued)

*Primary Examiner* — Noah S Wiese
(74) *Attorney, Agent, or Firm* — Jordan and Koda, PLLC

(57) ABSTRACT

A method for producing a glass solder green seal, wherein a paste comprising a glass solder powder is applied to the surface of a screen, which on the bottom side and in the screen mesh comprises regions having a coating impermeable to the paste, and the paste is pushed through the screen onto a substrate and subsequently dried, wherein printing is carried out onto an intermediate carrier serving as the substrate, from which the dried glass solder green seal can be completely detached.

19 Claims, 4 Drawing Sheets

(56) References Cited

U.S. PATENT DOCUMENTS

| | | | |
|---|---|---|---|
| 4,959,330 A * | 9/1990 | Donohue | C03C 3/062 |
| | | | 428/689 |
| 6,165,594 A | 12/2000 | Moh et al. | |
| 6,214,250 B1 | 4/2001 | Moh et al. | |
| 6,455,998 B1 | 9/2002 | Moh et al. | |
| 6,582,805 B1 | 6/2003 | Moh et al. | |
| 6,635,193 B1 * | 10/2003 | Fukushima | C03C 4/16 |
| | | | 252/500 |
| 6,656,625 B1 | 12/2003 | Thompson et al. | |
| 6,897,610 B1 * | 5/2005 | Aoki | C03C 4/16 |
| | | | 313/586 |
| 2001/0001285 A1 | 5/2001 | Moh | |
| 2004/0099364 A1 * | 5/2004 | Suzuki | B32B 18/00 |
| | | | 156/89.11 |
| 2005/0147866 A1 | 7/2005 | Ko et al. | |
| 2005/0224827 A1 | 10/2005 | Mund et al. | |
| 2005/0266252 A1 * | 12/2005 | Rita | C03B 19/06 |
| | | | 428/432 |
| 2009/0004544 A1 | 1/2009 | Mukerjee et al. | |
| 2009/0061282 A1 | 3/2009 | Wu et al. | |
| 2010/0167032 A1 * | 7/2010 | Lee | H01J 11/12 |
| | | | 428/212 |

FOREIGN PATENT DOCUMENTS

| | | |
|---|---|---|
| DE | 10 2004 049 955 | 4/2006 |
| DE | 10 2009 001 216 | 9/2009 |
| GB | 2 180 990 | 4/1987 |
| WO | WO-99/36901 | 7/1999 |
| WO | WO-99/54131 | 10/1999 |
| WO | WO-00/59839 | 10/2000 |
| WO | WO-03/103358 | 12/2003 |

\* cited by examiner

METHOD FOR PRODUCING A SOLDER GLASS GREEN SEAL

The invention relates to a method for producing a glass solder green seal.

BACKGROUND OF THE INVENTION

Glass solders are used in the related art, among other things, for sealing between components and for electrical insulation. In the industrial field, glass solders are used in photovoltaics and in fuel cell technology, for example. Molten glass solders are used there to connect individual cells and other components in series and to separate these from each other electrically, and in an mechanically gastight manner. This covers, for example, metallic or ceramic interconnectors, cells, as well as base and cover plates.

Commonly used methods for applying a glass solder onto a substrate are the screen printing technique, dispensing methods, and the tape casting technique. Screen printing, generally speaking, involves printing the printing ink through a fine-meshed fabric onto the material to be imprinted, using a squeegee. The mesh apertures of the fabric are rendered impermeable to the ink by a stencil in those areas of the fabric where, in keeping with the print image, no ink is to be transferred. The technique has been previously published for the production of fuel cell stacks and for the production of photovoltaic cells.

It is also known to produce ceramic green tapes using a tape casting method. It is known from US 2009/0004544 A1 to produce green seals from such tapes by way of stamping.

Tape production by way of casting has the drawback that it is relatively complex, and the required stamping tool is significantly more expensive than a printing screen. The actual seal accounts for only a small surface proportion of the tape used in the stamping process, and the majority of the paste disadvantageously becomes stamping scrap. This scrap, in turn, is only conditionally reusable, since consistency in the formulation requires that the same proportion is used at all times, and additionally, reprocessing the scrap necessitates special measures. When a tape that is commercially available in the market is to be used, the formulation of the same is generally not known. A comparison of the costs that are incurred in the production of green seals using the two methods shows that tape casting is considerably more expensive than screen printing.

The drawback of the screen printing method is that uneven shapes are difficult to imprint with the paste, since no uniform layer thickness can be created. This drawback is particularly significant when thick layers are applied to a component so as to be bonded to another component.

SUMMARY OF THE INVENTION

It is the object of the invention to provide a method for producing a glass solder green seal which can be used to create evenly thick, mechanically flexible, manageable glass solder green seals, wherein the layer thickness of the same is to be at least 100 µm. This layer thickness is thus based on the thickness after driving the solvent out of the paste and prior to burning the binder off the paste.

DESCRIPTION OF THE PREFERRED EMBODIMENTS

Figure 1:
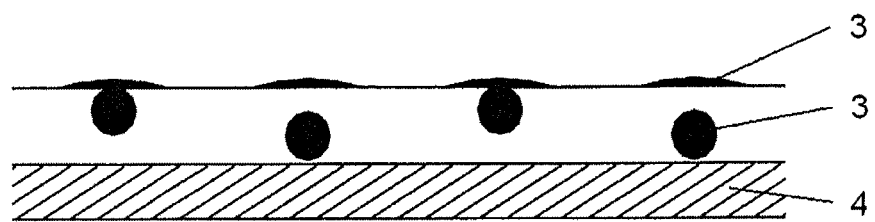
FIG. 1 shows a cross-section through a screen printing screen.

In the method according to the invention for producing a glass solder green seal, a paste comprising a glass solder powder is applied to the surface of a screen, which on the bottom side and in the screen mesh comprises regions having a coating impermeable to the paste. The paste is pushed through the screen onto a substrate and subsequently dried. Printing is carried out onto an intermediate carrier serving as the substrate, from which the dried glass solder green seal can be completely detached.

The coating of the screen advantageously causes only those areas of the intermediate carrier to be imprinted, where the coating is not present. The coating on the screen serves as a mask for the screen printing process. In addition, the coating of the screen advantageously acts as a spacer between the substrate and the screen, which increases the thickness of the glass solder green seal depending on the planned use. Correspondingly, a material that is dimensionally stable and abrasion-proof during the screen printing process must be selected for the coating, so that a sufficiently high layer thickness is created. The material is moreover preferably resistant to the solvents used in the paste.

The overall thickness of the paste applied to the intermediate carrier then increases proportionally with the thickness of the coating on the screen. The thickness of the glass solder paste applied to the intermediate carrier is determined by the upper edge of the screen fibers onto which the paste is applied to the lower edge of the coating on the opposite side of the screen which rests on the intermediate carrier. If the cross-section of the fibers of the screen is 150 µm thick, for example, an overall fiber thickness of approximately 300 µm is obtained. If the coating of the screen, measured from the bottom, is an additional 300 µm thick, a paste application having a maximal thickness of 600 µm results on the intermediate carrier. After printing, the paste is still wet. The thickness on the intermediate carrier does not correspond exactly to the overall screen thickness, but is also determined by the open surface of the screen.

The coating of the screen on the bottom should preferably be at least 100 µm thick. It may be 200 µm, 300 µm, 400 µm, 500 µm, 600 µm or 700 µm thick, and can additionally take on any intermediate value. Correspondingly, it may thus be 101 µm, 102 µm, 103 µm to 698 µm, 699 µm, 700 µm.

Measured starting from the screen surface, particularly advantageously the coating should approximately be an additional 300 µm to 500 µm thick. The coating advantageously allows reproducible, dry glass solder green seals having a thickness of at least 100 µm, and in particular having a thickness of more than 300 µm to 400 µm, and in particular even of as much as 600 µm, and optionally even thicker, to be produced.

According to the invention, a green seal is produced by way of such a modified method, combined with various further measures. The screen printing is carried out in the first step onto this intermediate carrier, serving as the substrate.

So as to achieve dry layer thicknesses of 400 µm, and preferably 400 µm to 800 µm and greater, the screen printing method should be carried out using a particularly coarse-mesh screen, so that even a paste having a high solids content, and which consequently has relatively high viscosity, is able to pass the screen mesh in sufficient quantity. So as to achieve the desired layer thickness at all, it should in any case be the bottom of the screen that comprises the additional coating preferably having a thickness of 300 to 500 μm, again measured starting from the screen surface.

The coating of the screen can preferably be composed of a conventional photoresist. Such photoresists are customarily available in the industry and form a layer fixedly joined to the screen fibers. In areas where the photoresist on the screen and in the screen mesh closes the screen mesh, the glass solder paste is not able to pass the screen. The photoresist advantageously allows a mask to be created on and in the screen, which thereafter prevents the passage of the glass solder paste. A person skilled in the art will draw on the customary methods of screen production to produce the screen.

The screen is produced depending on the use and the objectives of the user. The specifications primarily relate to the fabric dimensions and the EOM layer thickness. The details of screen production, such as the tensioning device for the screen fabric, the adhesive for fixing the tensioned screen fabric to the frame, the trade name of the photoresist, the drying conditions for the photoresist, the lighting device for the screen coated with photoresist, the light source, and so forth, are known to persons skilled in the art. The procedure for applying a sufficiently thick OEM (emulsion over mesh) layer is known to persons skilled in the art.

Depending on the thickness of the coating, or the thickness of a photoresist, and the thickness of the fibers of the screen, print images made of paste are created in the form of glass solder green seals having a high thickness on the substrate intermediate carrier, in keeping with the screen.

The first substrate used for the paste is an intermediate carrier, in particular a plastic film or a metal foil. It is also possible to use commercially available, coated parchment paper as the intermediate carrier. During the process, this film or foil is advantageously imprinted, serving as the intermediate carrier or first substrate.

The intermediate carrier is particularly advantageously of level design. This results in good transferability of the paste onto the intermediate carrier, without causing particular strain on the material, such as that resulting from the squeegee or the like.

The foil or film selected is one that is preferably coated with a coating that is non-stick with respect to the imprinted paste to be selected. It is likewise possible to use a different intermediate carrier as the first substrate for the paste.

The carrier film or foil, serving as the intermediate carrier, must satisfy the following requirements in particular:
 sufficient adhesion of the liquid, solvent-containing screen printing paste to the film or foil;
 sufficient solvent resistance;
 dimensional stability at the temperature required for drying the screen printing paste; and
 complete and easy detachability of the dried glass solder green seal.

Polyethylene terephthalate (PET) has proven its worth as a film material for the tape casting technique. PET film is advantageously stable up to 115° C. Such films can also be used for the method according to the invention for producing glass solder green seals.

The surface properties of the PET film are to be modified in the desired manner by an additional surface coating, such as by applying a suitable non-stick coating for the glass solder paste.

Being a contact printing method, screen printing requires the paste to make contact with the substrate surface during the printing process. Thus, sufficient adhesion of the paste to the intermediate carrier substrate is required to transfer the paste to the surface of the intermediate carrier serving as the first substrate. On the other hand, the dried paste, without the solvent, must also be easily detachable again from the carrier film, serving as the intermediate carrier, in the form of the glass solder green seal according to the invention. An additional non-stick coating of the intermediate carrier or of the film should thus allow sufficient adhesion of the paste, which is still moist, during the printing process, while the subsequently dried paste can then be easily detached from the surface.

A squeegee (PUR rubber) having a special cross-section may be used. By adding a chamfer at the front edge of the squeegee, a particularly high dynamic pressure is created during the printing process, and the necessary layer thickness is achieved. The squeegee speed should be carefully matched to the screen printing process. It is considerably lower than is otherwise customary in screen printing. Deviating from standard procedure, a squeegee is also to be used as a flood bar.

In the first step, the glass solder paste is applied to the screen and pushed into the mesh of the screen by the movement of the flood bar. The holder, together with the squeegees, is then moved in the opposite direction, and contact of the glass solder paste with the intermediate carrier is created by way of the squeegee.

So as to move the large amount of paste necessary for the high wet layer thicknesses through the mesh, the squeegee must exert high dynamic pressure on the paste. For this purpose, the squeegee is provided with a 45° chamfer and is additionally installed rotated by approximately 25°, so as to reduce the resulting angle with respect to the screen surface even further. The squeegee rubber should be relatively soft, such as having a Shore A hardness of 65, in order to adapt to small irregularities of the screen surface; however, at the same time, it should be relatively thick in order to preserve compartmentation of the paste as a result of a large volume between the screen and squeegee. Moreover, the squeegee should not become excessively deformed during the printing process.

Contrary to formulations for tape casting, in which solvents having a low boiling point are generally used, pastes comprising solvents having a high boiling point are better suited for the present method. This ensures the necessary constancy of viscosity on the screen during the printing process. Accordingly, only such solvents having high boiling points are used for the method according to the invention.

According to the invention, solvents that evaporate very slowly are used in the pastes. The evaporation rate is preferably greater than 300 (diethyl ether=1). This particularly advantageously also allows series of printing processes to be printed, wherein the paste still delivers almost constant print results even after multiple printing processes.

The solvent, and in particular also the necessary plasticizer, should be selected with adequate occupational safety and health in mind.

The glass solder paste should at least comprise the following components, selected from solvents, binding agents, plasticizers and glass solder powders and have a solids content of at least 60% to a maximum of 95%, in particular 65% to 75%, and particularly preferably approximately 65% to 72% wt/wt, in particular 65, 66, 67, 68, 69, 70, 71 and 72% wt/wt.

Polyvinyl butyral (PVB) is preferably selected as the binding agent for the screen printing method. These binding agents are available under the trade name Mowital©, for example.

The average molar mass of the polyvinyl butyral used in binding agents for cast tapes ranges from 40,000 g/mol to 80,000 g/mol. A high solids content of the paste is desirable for printing thick layers. So as to keep the viscosity of the paste low when the solids content is high, a polyvinyl butyral having an average molar mass ranging from 28,000 g/mol to 38,000 g/mol is preferably selected.

Disperbyk-110 was used as an auxiliary dispersing agent to ensure good dispersion of the glass solder powder. This dispersing additive also helps ensure lower viscosity.

The binding agent that is particularly advantageously selected for the paste is Mowital© B 30 T. Surprisingly, it was found in extensive experiments that this binding agent produces glass solder green seals that are flexible to manage and can be detached particularly easily from the imprinted substrate without breaking, and can also be stored over a certain period of time. This measure ultimately makes series produced of glass solder green seals suitable for storage and for shipping.

For this purpose, the flexibility of the produced green seals is ascertained based on 180° bending test over a mandrel having a defined diameter. The minimum bending radius at which the green seal no longer tears or breaks serves as the characteristic value. For the test, 1 cm wide strips are cut from the green seal and bent 180° over increasingly smaller mandrels or drill shanks. For the glass solder green seal according to the invention, this method shows minimum bending radii of approximately 5.5 mm for approximately 500 to 600 µm thick green seals (stored a maximum of one month).

Selecting triethylene glycol bis-(2-ethylhexanoate) as the plasticizer in the paste advantageously achieves mechanical elasticity or flexibilization of the green seals; however, contrary to other plasticizers, this is not classified as a hazardous work material. Polyethylene glycols, for example, are likewise suited.

Selecting tripropylene glycol methyl ethers, adipic acid dimethyl esters, glycolic acid butyl esters (hydroxyacetic acid butyl esters) as solvents in the paste advantageously has the effect that the solvents in the paste do not damage the non-stick coating of the intermediate carrier.

Ethers and esters having high boiling points, such as tripropylene glycol methyl ethers, adipic acid dimethyl esters and glycolic acid butyl esters (hydroxyacetic acid butyl esters), were therefore solvents that were considered.

The solvent used to create the green seal is preferably driven out of the paste at approximately 60 to 90° C. The glass solder green seals can then be mechanically flexibly managed and stored for some time.

Glass solder 48 may be selected as the glass solder powder. Glass solder having the designation glass solder H is also particularly suited.

In a particularly advantageous embodiment of the invention, the glass solders according to the invention are stabilized with fibers, for example YSZ fibers are provided, in particular the glass solder H.

TABLE

| Glass solder 48: | | |
|---|---|---|
| | Mol % | Wt. % |
| $Al_2O_3$ | 0.4 | ~0.5 |
| BaO | 18.3 | ~36.7 |
| CaO | 21.6 | ~15.9 |
| $SiO_2$ | 59.7 | ~46.9 |

Glass solder 48 has proven to be a glass material (glass solder) that is excellently suited.

The glass material used, such as glass solder 48 or glass solder H, is produced at the highest possible purity. For example, the use of aluminum oxide crucibles or other fireproof crucibles is generally foregone since, with these crucible materials, the aluminum oxide content and trace impurities increase in the melting process.

The glass material according to the invention can in particular be produced in the form of frit and be used further. Frits denote mixtures, composed of raw materials, which are fused in a fusing oven, quenched, and granulated. This gives the glass material in ground form as a powder for further use.

Preferably, raw materials having purities >99% were used for the mixture. The following chemicals from Merck were used: sea sand, barium carbonate, calcium carbonate, anhydrous aluminum oxide. The glass material is inductively fused at temperatures around approximately 1480° C. in a platinum crucible and homogenized by melting it twice. The melt is then quenched in ice water, and the grit is ground in an agate grinder. The mean particle size is approximately 10 to 15 µm; the coarse fraction >32 µm is removed by way of sieving.

Pastes comprising organic binding agents are produced for the application as solder materials.

A glass solder paste according to the invention comprises at least the following components selected from solvents, binding agents, plasticizers and glass solder powders and has a solids content of at least 60% to a maximum of 95%.

Particularly advantageously a paste having a viscosity of 25 to 35 Pa·s at 30.0° C. is used (plate/plate, diameter upper plate 25 mm, plate distance 200 µm).

In particular Mowital© B 30 T may be used as the binding agent for the paste.

To create the glass solder green seal, the solvent is preferably driven out of the paste at approximately 60 to 90° C. after printing on the intermediate carrier.

The dried glass solder green seal then produced by way of the method is mechanically flexible to manage, sufficiently thick, and particularly advantageously can be stored.

Thereafter, the glass solder green seal is subsequently transferred from the intermediate carrier, serving as the first substrate, onto a substrate to be joined.

After drying the print and removing the same from the intermediate carrier, the green seal is thus transferred onto the component or components to be joined. The produced glass solder green seals are mechanically flexible and particularly thick in accordance with the invention. They can be readily temporarily stored, or else shipped, prior to the joining process.

The glass solder green seals according to the invention can particularly advantageously also be used to join non-planar substrates that are to be joined in accordance with the invention, as they can be found in components of fuel cells or solar cells, for example. In the case of the fuel cell, or a stack comprising multiple fuel cells, the same is heated during commissioning to approximately 850 to 950 or even 1000° C. with the proviso of a defined temperature profile. The binding agent in the dried glass solder green seal is driven out between 400° C. and 700° C. If the temperature increases further, the glass solder ceramizes and bonds the components to be joined. Since irregularities in the joining surface are to be compensated for by way of the glass solder joining, the resulting glass solder joining thicknesses are generally 100 to 300 μm.

In particular, components of fuel cells or solar cells can be used as substrates to be joined. In principle, any use for material films that are to be used for sealing or bonding, such as in the solar cell industry, is conceivable. In addition, the use of the glass solder green seals according to the invention for any arbitrary surface coating is also conceivable.

The method according to the invention is particularly suited for producing glass solder green seals for components to be joined which do not have a level surface or joining surface (such as SOFC interconnectors) in the sealing plane. It has previously not been possible without difficulty to imprint a substrate to be joined which has elevations or depressions by way of screen printing. First, no homogeneous layer thicknesses can be achieved, and secondly the screen and squeegee wear would be too high. This is another reason why a level intermediate carrier is used.

The use of printed green seals is also particularly suited for components that are susceptible to breakage and could be damaged during the screen printing process by mechanical stress (such as ceramic SOFC cells).

The use of printed green seals is also particularly suited for components that, as a whole or in parts, must not come in contact with solvents (such as SOFC components comprising protective layers). The solvents in the soldering pastes could otherwise, without the use of green seals, result in damage to the components or coatings.

Moreover, the special case of a "contact or protective layer on SOFC components" is subject to the risk of local mixing of the soldering paste and the coating, which can result in degraded mechanical stability (formation of pores) and reduced electrical resistance (risk of short circuits) in the joined bond.

The use of green seals for joining is also particularly suited for components that, due to size, shape and mass, can be treated only with difficulty. For example, the positioning and removal of large-volume and heavy components would be time-consuming and complex, and the use of lifting gear would require a correspondingly large space underneath the screen printing system.

The method is particularly suited for the separate mass production of green seals (assembly line production). It is conceivable that multiple, even different, seals can be produced in one printing operation, which can then be dried in a furnace section and ultimately be stored.

The seals can also advantageously be printed onto a film strip for this purpose, which is advanced after every printing operation and subsequently passes through a drying furnace. This allows storable and shippable glass solder green seals to be produced quickly and precisely without having to move parts.

The method according to the invention can then be used particularly advantageously as a method for joining components for fuel cells. For this purpose, a joining method for fuel cell components allows the production of glass solder green seals according to the above-mentioned screen printing method, followed by transfer of these between the generally non-planar components of the fuel cells which are to be joined. The glass solder green seal is mechanically flexible and nestles against the surface of the first component and the irregularities thereof. The second component, which is to be joined to the first component, is placed thereon. After the binding agent has been burned off, starting at approximately 400° C., joining is then carried out at a suitable temperature.

EXEMPLARY EMBODIMENTS

The invention will be described in more detail hereafter based on exemplary embodiments and the accompanying figures, without thereby limiting the invention.

FIG. 1 shows a cross-section through a screen printing screen. The sectional drawing shows the screen fibers 3 as black circles. An additional coating 4 is shown beneath the screen fabric in the form of a hatched area. The illustration only shows the coating 4 beneath the screen fibers 3, however not in the mesh, although it goes without saying that the coating is present there.

This coating 4 advantageously ensures a defined distance between the screen 3 and the intermediate carrier substrate (not shown) during the printing process.

Figure 2:
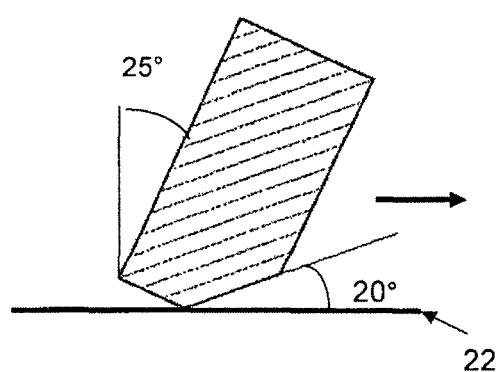
FIG. 2 shows a sectional illustration of the squeegee made of PUR rubber which is used.

FIG. 2 shows a sectional illustration of the squeegee made of PUR rubber which is used. The squeegee rubber is clamped into a machine holder at the upper rectangular portion. The lower portion of the squeegee rubber projects from the holder. So as to increase the dynamic pressure during the printing process, the squeegee rubber is chamfered at an angle of 45°. In addition, the machine holder, together with the squeegee, is rotated clockwise at an angle of 25°. During the printing process, the squeegee thus impinges on the screen surface 22 at a resulting angle of approximately 20° and transports the paste (to the right during the printing movement) across and through the screen.

Figure 3:
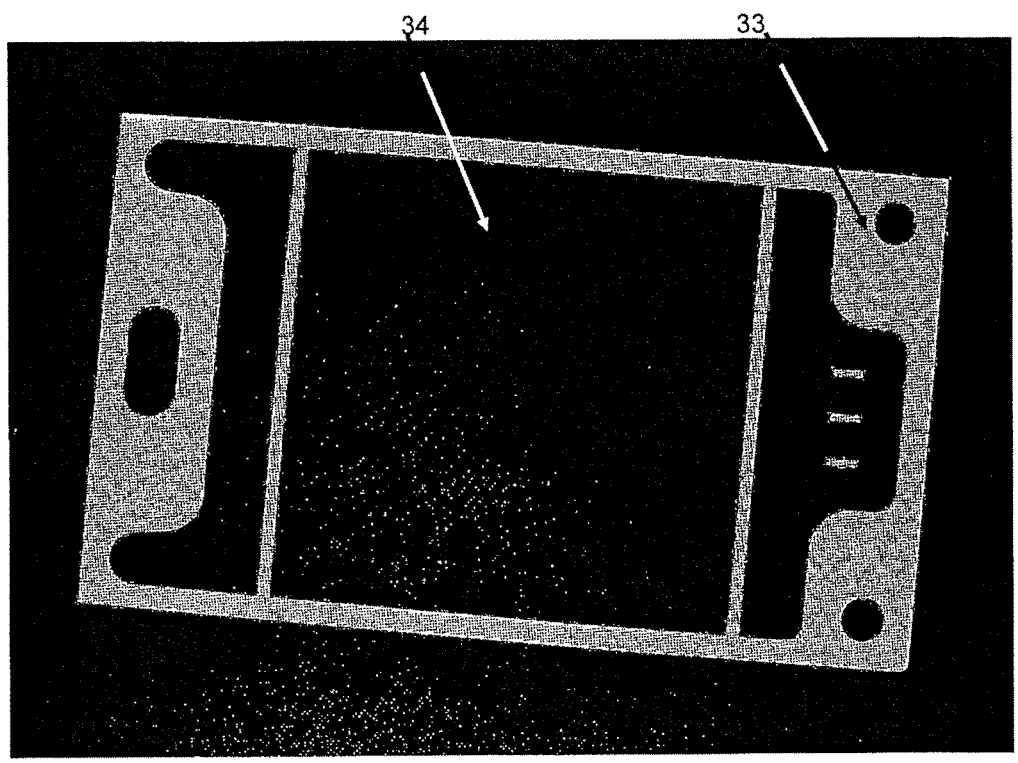
FIG. 3 shows that the screen that is used.

FIG. 3 shows the screen that is used. The illustration shows a photograph of the screen bottom comprising the darker photoresist 34 in the form of an EOM coating. The lighter polyester screen fabric 33 can be seen in the open motif areas. The outer motif dimensions are 365×222 mm.

Figure 4:
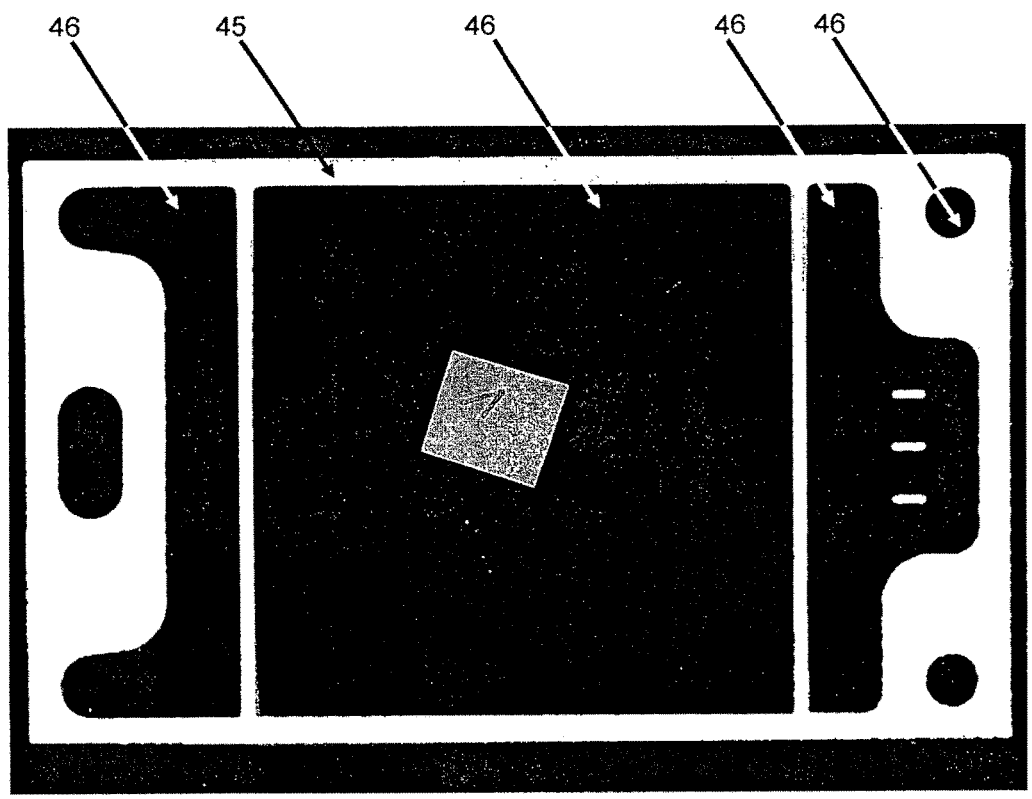
FIG. 4 shows a photograph of glass solder green seal no. 1, produced by way of the screen and using the past formulation FZT02-3.

FIG. 4 shows a photograph of glass solder green seal no. 1, produced by way of the screen according to FIG. 3 and using the paste formulation FZT02-3. The glass solder green seal 45 is light in color and approximately 500 μm thick after drying. In this image, the green seal is still located on the transparent intermediate carrier film 46, which can be seen as a dark base.

1. the Glass Solder Paste

A test formulation comprising Mowital© B 30 HH as the binding agent in the glass solder paste could not be detached from the carrier film without being destroyed. However, it was surprisingly found in continuously adapted experiments that Mowital© B 30 T, which is substantially similar to Mowital© B 30 HH in terms of composition, does not have this disadvantage. Mowital© B 30 HH does not dissolve in the adipic acid dimethyl ester originally intended as the solvent, Mowital© B 30 T. Glycolic acid butyl ester was therefore a possible solvent for use in the intended formulation.

| A. Example Formulation 1 | |
|---|---|
| Component | Mass in g |
| Glass solder 48 | 68.68 |
| Mowital © B 30 T | 4.07 |
| Glycolic acid butyl ester | 24.11 |

-continued

A. Example Formulation 1

| Component | Mass in g |
| --- | --- |
| Disperbyk-110 | 0.89 |
| Triethylene glycol bis-(2-ethylhexanoate) | 2.25 |
| Total | 100.00 |

Glass solder 48 was used. This is a barium calcium aluminum silicate glass, which was ground after melting and has an average particle size of 12 μm. The paste viscosity (plate/plate, diameter upper plate 25 mm, plate distance 200 μm) is 25 to 35 Pa·s at 30.0° C.

The glass solder paste is produced in two steps. First, a binder solution is prepared. The binder solution used for the example formulation has the designation BM17.

Production of the Binding Agent BM17

| No. | Component | Amount in g | | | |
| --- | --- | --- | --- | --- | --- |
| 1 | Mowital ® B 30 T | 34.00 | 25.50 | 17.00 | 4.25 |
| 2 | Butyl glycolate | 166.00 | 124.50 | 83.00 | 20.75 |
| | | 200.00 | 150.00 | 100.00 | 25.00 |

25 g batch: 4.25 g Mowital© B 30 T is weighed in a crystallizing dish having a volume of 50 ml. Furthermore, 20.75 g butyl glycolate is weighed in a beaker glass having a volume of 100 ml and heated. Mowital is now gradually sprinkled in while stirring using a magnetic stirrer, the beaker glass is covered with a watchglass, and the mixture is heated further to approximately 60° C. The mixture is maintained at this temperature while stirring for approximately 40 minutes, until the Mowital has dissolved, and then the supply of heat is stopped.

150 g batch: 25.50 g Mowital© B 30 T is weighed in a crystallizing dish having a volume of 100 ml. Furthermore, 124.50 g butyl glycolate is weighed in a beaker glass having a volume of 500 ml and heated. Mowital is now gradually sprinkled in while stirring using a magnetic stirrer, the beaker glass is covered with a watchglass, and the mixture is heated further to approximately 60° C. The mixture is maintained at this temperature while stirring for approximately 40 minutes, until the Mowital has dissolved, and then the supply of heat is stopped.

The glass solder paste is produced in a second step. The example formulation is designated FZT02-3. The production of such a printable paste can be reproduced based on the accompanying standard operating procedure FZT02-3.

Standard Operating Procedure FZT02-3—Version 1.1 of Aug. 21, 2012

Production of Glass Solder Paste FZT02-3 (68.7% solids content)

| No. | Component | Amount in g | | | |
| --- | --- | --- | --- | --- | --- |
| 1 | Glass solder powder Q153T180411 | 274.72 | 206.04 | 103.02 | 68.68 |
| 2 | Binding agent BM17 | 95.96 | 71.97 | 35.99 | 23.99 |
| 3 | Butyl glycolate | 16.76 | 12.57 | 6.29 | 4.19 |
| 4 | Disperbyk-110 | 3.56 | 2.67 | 1.34 | 0.89 |
| 5 | Tri(ethylene glycol)bis(2-ethylhexanoate) | 9.00 | 6.75 | 3.38 | 2.25 |
| | | 400.00 | 300.00 | 150.00 | 100.00 |

Glass solder batch: Q153T180411 (Solder 48 without Co-oxide additive)

150 g batch: 103.02 g glass solder powder 48 is weighed in a crystallizing dish having a volume of 200 ml. A mortar is then loaded with 35.99 g binding agent BM17 and 6.29 g butyl glycolate. 1.34 g Disperbyk-110 is then added dropwise to the binding agent using a pipette and immediately mixed. Thereafter, the glass solder powder is gradually mixed in small portions with the binding agent in the mortar. Finally, 3.38 g component 5 is added dropwise using a pipette and immediately mixed. The paste is then homogenized for another 5 minutes in the mortar and then loaded into a plastic container having a volume of 100 ml. Finally, the paste is treated with ultrasound twice for 50 seconds (with a short pause in between) in this container. Care should be taken to ensure that the sonication finger has as little contact as possible with the walls and the bottom of the container.

The solids content of the screen printing paste is 68.7%.

B. Example Formulation 2

Production of a Binding Agent BM17-3

| No. | Component | Amount in g | | | |
| --- | --- | --- | --- | --- | --- |
| 1 | Mowital ® B 30 T | 54.30 | 36.20 | 18.10 | 4.53 |
| 2 | Butyl glycolate | 245.70 | 163.80 | 81.90 | 20.48 |
| | | 300.00 | 200.00 | 100.00 | 25.00 |

Batch of 100 g/200 g/300 g

Mowital is weighed in a crystallizing dish having a volume of 50 ml/100 ml. Furthermore, the butyl glycolate is weighed in a beaker glass having a volume of 400 ml. Then, the heater is turned on and the butyl glycolate is heated to 35° C. The temperature is controlled by way of a contact thermometer. The Mowital is then evenly sprinkled in portions into the beaker glass through a screen while stirring using a magnetic stirrer (35 mm×16 mm). The stirring speed is set to position 4 and slowly increased to 10 as the viscosity rises.

The next portion of Mowital is not added until the previous portion has been dispersed and wetted. A vortex forms in the center of the surface of the liquid. As soon as the added amount of Mowital has been picked up by the vortex, new Mowital is sprinkled in so that the vortex is preserved. Otherwise a smooth liquid surface will form, which makes sprinkling in and wetting difficult.

When approximately two thirds of the total Mowital has been added (after approximately 20 minutes), the temperature is increased to 50° C., and the remaining amount of Mowital is sprinkled in.

When all the Mowital has been added, the thermometer is set to 60° C., and the solution is heated further. Stirring now continues for another 75 minutes, then the heater is shut off and stirring is continued until all the Mowital is dissolved (approximately 2 hours). The stirring speed is set to position 3 to 4 for this purpose, so as to limit the formation of air bubbles.

The binding agent solution is subsequently loaded into a storage bottle.

In addition to the above-described glass solder 48, a glass solder composition made of glass H with 13% YSZ fibers has also proven to be suitable for producing green seals.

| Glass solder | BaO [Wt. %] | CaO [Wt. %] | SiO$_2$ [Wt. %] | Coefficient of expansion at 600° C. [10$^{-6}$ K$^{-1}$] | Dilatometric softening temperature (T$_D$) [° C.] | Joining temperature [° C] |
|---|---|---|---|---|---|---|
| H | 48.21 | 6.05 | 29.75 | 9.5 | 714 | 820 |

Al$_2$O$_3$, B$_2$O$_3$, V$_2$O$_5$, ZnO can be used as additives (if necessary) for the glass solder H.

The production of the glass solder powder (melting, fitting, grinding) is carried out in a manner similar to the method for producing the above-described glass solder 48. However, the glass solder H powder is not sieved after grinding, and subsequently likewise has an average particle size of approximately 10 to 15 μm.

Modified YSZ fibers (weight fraction 13%) are added to this glass solder powder.

Fibers with the designation ZYBF-2 were supplied by Zircar Zirconia, Inc.; P.O. Box 287; Florida, N.Y. 10921-0287. The fibers were modified by way of grinding in a planetary mill (Fritsch Pulverisette; BJ.2005; no. 05.5000/00590). 5 g of fibers were milled with 30 g acetone using 16 agate balls (having a diameter of 19 mm) in agate beakers for 10 minutes at 300 rpm.

Nominal composition of ZYBF-2 according to weight data (% by weight calcined for ½ hour at 950° C.). ZrO$_2$=90%; Y$_2$O$_3$=10%; trace elements <1%; bulk density, g/cm$^3$ (PCF)=0.34 (21); % by weight H$_2$O=0.05 to 0.2; % by weight Cl$^-$=<0.1; annealing loss, ½ hour at 950° C.=0.1 to 0.4; specific BET surface area, m$^2$/g=4.

The ground product is then dried at 30° C. for at least 24 hours. The paste is produced according to formulation FZT13(1.1). The binder solution used for this purpose is described in formulation BM17-3(3.3).

Production of Glass Solder Paste FZT13 having a 71.8% solids content:

| No. | Component | Amount in g | | | | |
|---|---|---|---|---|---|---|
| 1 | Glass solder powder H | 249.88 | 187.41 | 124.94 | 62.47 | 15.62 |
| 2 | Fibers ZYBF-2 (ground) | 37.32 | 27.99 | 18.66 | 9.33 | 2.33 |
| 3 | Binding agent BM17-3 | 92.32 | 69.24 | 46.16 | 23.08 | 5.77 |
| 4 | Butyl glycolate | 7.36 | 5.52 | 3.68 | 1.84 | 0.46 |
| 5 | Disperbyk-110 | 3.68 | 2.76 | 1.84 | 0.92 | 0.23 |
| 6 | Poly(ethylene glycol)bis(2-ethylhexanoate) | 9.44 | 7.08 | 4.72 | 2.36 | 0.59 |
| | | 400.00 | 300.00 | 200.00 | 100.00 | 25.00 |

Glass solder batch: H

Batches of 25 g/100 g/200 g/300 g/400 g

The glass solder powder H and the fibers ZYBF-2 are weighed in a crystallizing dish having a volume of 100 ml/200 ml and subsequently mixed. Then a mortar is loaded with the binding agent BM17-3 and butyl glycolate. The Disperbyk-110 is then added dropwise to the mixture using a pipette and immediately mixed. Thereafter, the powder mixture is gradually mixed in small portions with the binding agent in the mortar. Finally, component 6 is added dropwise using a pipette and immediately mixed. The paste is then homogenized for another 5 minutes in the mortar and, up to the 300 g batch size, is then loaded into one or two plastic containers having a content of 50 ml/100 ml. Finally, the paste is treated with ultrasound twice for 50 seconds (with a short pause in between) in the container (the 25 g batch remains untreated). Care should be taken to ensure that the sonication finger has as little contact as possible with the walls and the bottom of the container.

The 400 g batch is transferred into a beaker glass having a volume of 400 ml and treated with ultrasound twice for 60 seconds (with a short pause in between) in the beaker glass. Care should be taken to ensure that the sonication finger has as little contact as possible with the walls and the bottom of the glass. The glass is then covered with a watchglass and used the same day for screen printing.

2. The Intermediate Carrier (Carrier Film)

A film from Mitsubishi Polyester Film GmbH was used as the carrier film, which in the present example was: siliconized PET film Hostaphan RN 75 2SLK, thickness 75 μm. This film is used as the first substrate or intermediate carrier in the screen printing process.

3. the Screen

Screen design (see FIG. 1): polyester fabric 8-300. The screen bottom is additionally coated (emulsion over mesh, EOM) with commercially available photoresist. Thickness of the additional layer: 230 to 350 μm.

The material of the screen coating on the bottom was a commercially available photoresist, which the screen manufacturer selects based on the requirements. The requirements were solvent resistance, the coating thickness, and the screen type, for example.

TABLE

| Screen data | |
|---|---|
| Fabric | 8-300 |
| | 20 |
| Bond | 1/1 |
| Fibers per cm | 8 |
| Fiber diameter d [μm] | 300 |
| Emulsion over mesh, EOM [μm] | 230-350 |

The angle between the fiber direction and longitudinal frame side was 7°. The angle between the motif and longitudinal frame side was 5° (motif rotation). The fiber material was composed of polyester.

A special squeegee made of PUR rubber (see FIG. 2), with a Shore A hardness of 65, having a rectangular cross-section was used. The thickness was 17 mm, and the chamfer having half the thickness had an angle of 45°. The angle between the squeegee axis (in the cross-section from top to bottom) and the screen during screen printing was 25°. The squeegee speed was approximately 90 mm/s. The flood bar was made of PUR rubber, had a rectangular cross-section, a thickness of 9 mm, and a Shore A hardness of 90. The resulting angle with respect to the screen surface was 20°.

The flood bar and squeegee move the paste across and through the screen. In the present case, a squeegee having a chamfer was used, which increases the dynamic pressure during the printing operation, and thus the paste throughput.

The resulting, dried glass solder green seals had a thickness of approximately 600 μm, and there was no difficulty storing them for months. They have already been used to successfully join non-planar components for fuel cells.

For this purpose, the method allows the insertion a mechanically flexible glass solder green seal according to the invention, produced by the method according to the invention, between the components of a fuel cell which are to be joined. During commissioning, the binder is cured by The invention claims is:

1. A method for producing a glass solder green seal, comprising:
applying a paste comprising solvents, binding agents, plasticizers, and a glass solder powder to a surface of a screen, wherein the glass solder paste has a solids content of 60% to 95% wt/wt, and wherein the screen on a bottom side and in a screen mesh comprises regions having a coating impermeable to the paste, and the paste is pushed through the screen onto a substrate and subsequently dried, and
printing onto an intermediate carrier serving as the substrate, the intermediate carrier comprising a foil or film adapted to include a non-stick coating onto which the paste is received and from which the dried glass solder green seal can be completely detached from the non-stick coating of the adapted foil or film.

2. The method according to claim 1, wherein the coating on the bottom side of the screen has a thickness of at least 100 µm to a maximum of 700 µm.

3. A method according to claim 1, wherein a print image is created from dried paste having a thickness of approximately 100 µm to 1000 µm on the intermediate carrier serving as the substrate.

4. A method according to claim 1, wherein a plastic film or a metal foil or parchment paper is the intermediate carrier that is imprinted.

5. A method according to claim 1, wherein the glass solder paste comprises at least the following components selected from solvents, binding agents, plasticizers and glass solder powders and has a solids content of at least 60% to a maximum of 95%.

6. The method according to claim 1, wherein the glass solder powder is glass solder H.

7. A method according to claim 1, comprising a glass solder that is stabilized by fibers.

8. A method according to claim 1, wherein a squeegee having a chamfer of approximately 45° is placed onto the screen surface at an angle of approximately 25°, based on the longitudinal axis of the squeegee, and the paste is pushed through the screen onto the intermediate carrier substrate by moving the squeegee.

9. A method according to claim 1, wherein the paste is pushed through the screen by a squeegee that is moved across the substrate at a speed of no more than 180 mm/s.

10. A method according to claim 1, wherein the selection of a polyvinyl butyral having an average molar mass ranging from 28,000 g/mol to 38,000 g/mol as the binding agent for the paste.

11. The method according to claim 1, wherein the coating on the bottom side of the screen a has a thickness of 300 µm to 400 µm.

12. A method according to claim 1, wherein a print image is created from dried paste having a thickness of approximately 600 µm on the intermediate carrier serving as the substrate.

13. A method according to claim 1, wherein the paste is pushed through the screen by a squeegee that is moved across the substrate at a speed of approximately 120 mm/s.

14. A method for producing a glass solder green seal, comprising:
applying a paste comprising solvents, binding agents, plasticizers, and a glass solder powder to a surface of a screen, wherein the glass solder paste has a solids content of 60% to 95% wt/wt, and wherein the screen on a bottom side and in a screen mesh comprises regions having a coating impermeable to the paste, and the paste is pushed through the screen onto a substrate and subsequently dried, and
printing being carried out onto an intermediate carrier serving as the substrate, from which the dried glass solder green seal can be completely detached, and
wherein the binding agent for the paste is a polyvinyl butyral having an average molar mass ranging from 28,000 g/mol to 38,000 g/mol.

15. A method according to claim 1, further comprising completely detaching the dried glass solder green seal from the intermediate substrate.

16. A method according to claim 1, wherein said printing comprises printing onto said intermediate carrier, said intermediate carrier comprising:
said foil or film, and
said non-stick coating; and
wherein said non-stick coating coats said foil or film.

17. A method for producing a glass solder green seal, comprising:
applying a paste comprising solvents, binding agents, plasticizers, and a glass solder powder to a surface of a screen, wherein the glass solder paste has a solids content of 60% to 95% wt/wt, and wherein the screen on a bottom side and in a screen mesh comprises regions having a coating impermeable to the paste, and the paste is pushed through the screen onto a substrate and subsequently dried, and
printing being carried out onto an intermediate carrier serving as the substrate, from which the dried glass solder green seal can be completely detached, and
wherein the coating of the screen comprises a photoresist.

18. A method for producing a glass solder green seal, comprising:
applying a paste comprising solvents, binding agents, plasticizers, and a glass solder powder to a surface of a screen, wherein the glass solder paste has a solids content of 60% to 95% wt/wt, and wherein the screen on a bottom side and in a screen mesh comprises regions having a coating impermeable to the paste, and the paste is pushed through the screen onto a substrate and subsequently dried, and
printing being carried out onto an intermediate carrier serving as the substrate, from which the dried glass solder green seal can be completely detached, and
wherein the paste comprises a glass solder, the glass solder comprising said glass solder powder and being stabilized by fibers.

19. A method for producing a glass solder green seal, comprising:
applying a paste comprising solvents, binding agents, plasticizers, and a glass solder powder to a surface of a screen, wherein the glass solder paste has a solids content of 60% to 95% wt/wt, and wherein the screen on a bottom side and in a screen mesh comprises regions having a coating impermeable to the paste, and the paste is pushed through the screen onto a substrate and subsequently dried, and
printing being carried out onto an intermediate carrier serving as the substrate, from which the dried glass solder green seal can be completely detached, and
wherein a squeegee having a chamfer of approximately 45° is placed onto the screen surface at an angle of approximately 25°, based on the longitudinal axis of the squeegee, and the paste is pushed through the screen onto the intermediate carrier substrate by moving the squeegee.

\* \* \* \* \*